United States Patent [19]

Johansson

[11] 4,095,660
[45] Jun. 20, 1978

[54] ROLLER

[76] Inventor: Kurt Eilert Johansson, Timmermansgatan 12, S-981 00 Kiruna, Sweden

[21] Appl. No.: 723,323

[22] Filed: Sep. 15, 1976

[30] Foreign Application Priority Data

Sep. 18, 1975 Sweden .................................. 7510442

[51] Int. Cl.² .......................... G01G 19/08; G01G 3/14
[52] U.S. Cl. ........................................ 177/136; 177/211
[58] Field of Search ........................ 177/137, 147, 211; 73/141 A

[56] References Cited

U.S. PATENT DOCUMENTS

| 3,499,500 | 3/1970 | Harding | 177/211 X |
| 3,554,025 | 1/1971 | Andersson et al. | 177/211 X |
| 3,620,074 | 11/1971 | Laimins et al. | 73/141 A |
| 3,625,053 | 12/1971 | Laimins | 73/141 A X |
| 3,695,096 | 10/1972 | Kutsay | 73/141 A X |
| 3,879,998 | 4/1975 | Bradley | 177/211 X |

Primary Examiner—George H. Miller, Jr.
Attorney, Agent, or Firm—Flynn & Frishauf

[57] ABSTRACT

A roller-type apparatus for indicating a charge or load on a fixed axle comprises a roller rotatably mounted to the fixed axle, the charge or load being arranged to act on the peripheral surface of the roller. The axle is fixed at two spaced apart positions and the roller is rotatably supported on the axle at two spaced positions disposed adjacent the fixing positions of the axle and equally spaced relative to the center of the axle. At least one transmitter is coupled to the axle in the area between the spaced roller supporting positions for generating a signal in response to deflection of the axle under the influence of the charge or load. An indicating means is responsive to the signal for indicating the weight of the load, and the direction of weight of the load.

10 Claims, 2 Drawing Figures

ROLLER

This invention relates to a roller intended to indicate a charge or load, which roller is rotatably journalled on a fixed axle. The charge or load is arranged to act upon the peripheral surface of the roller.

It is previously known from the Swedish patent specification No. 7400523-2 (corresponding to U.S. Pat. No. 3,934,663) to gauge and indicate a load positioned on a vehicle by means of a sliding surface or roller capable of cooperating with one end of a spring arrangement in order to reduce and eliminate, respectively, the forces not acting in the vertical direction and to transfer the vertical forces to a separate transmitter unit emitting a signal proportional to the forces acting in the vertical direction.

The aforesaid location of the transmitter unit involves several disadvantages. As one of them can be mentioned that it requires an attachment means of a special design which is adapted to the transmitter unit and must be adapted also to the vehicle in question and to the different spring arrangements provided thereon. Moreover, different attachment means must be specially designed for different types of vehicles, which attachment means are bulky, heavy and expensive to manufacture. Furthermore, the roller used therein cannot be sealed against dirt and, therefore, must be lubricated regularly.

It is further known from Swedish Laid Out Document No. 309 501 (corresponding to U.S. Pat. No. 3,413,846) in a strip rolling mill to use a guide roller provided with pressure sensing means, each of which emits an electric output signal as a function of the force to which said pressure sensing means is exposed. Said device has the object to gauge the distribution of the strip tension along a long roller and utilizes an elastic tube for transferring only local variations in the strip tension to the nearest bearings. The guide roller acts in such a manner that the force in question is applied to the tube and sensed between the bearing boxes and the axle by the pressure sensing means. The most apparent disadvantage of this guide roller is that it is expensive and difficult to use for purposes other than guide rollers.

U.S. Pat. No. 3,827,514 discloses a block arrangement for determining the weight of the load lifted by a loading crane. According to this arrangement, the force is applied to the central portion of the axle, and the transmitters, therefore, must be positioned on both sides thereof. According to this U.S. patent the deflection of the axle is sensed whereby an S-shaped load curve is obtained which is strange and difficult to analyze when, as in FIG. 2 of said patent, one outer disc is exposed to a greater load than the other outer disc. Another basic weakness of the arrangement according to said patent is that in FIG. 2 the axle ends are assumed be supported in boreholes or the like, and the load is assumed to run through the centre of the bearing positions. This view is not correct when tenthousandth parts of a millimeter are to be sensed, but the bearing pressure can migrate along the entire axle support all the way to the inside of the hole edge where a concentrated load with material yield is effected. The result thereof is a displacement of the torque arm, rendering a poor accuracy and particularly a poor repeatability.

The present invention has the object to eliminate or reduce the aforesaid disadvantages, and particularly to produce a roller capable of being used in different connections for weighing weights or gauging loads with high accuracy and good repeatability by utilizing the smallest possible number of transmitters.

SUMMARY OF THE INVENTION

In accordance with the present invention, apparatus for indicating a charge or load on an axle comprises a substantially inelastic roller mounted on the axle, the axle being supported at two positions which are spaced apart in the longitudinal direction of the axle. The roller is rotatably supported on the axle at spaced positions respectively disposed adjacent the supporting positions of the axle and which are equally spaced relative to the center of the axle. At least one transmitter is coupled to the axle and located in the area between the spaced roller supporting positions for generating a signal in response to, and as a function of, deflection of the axle under the influence of the load or charge acting on the roller. An indicating means is coupled to the at least one transmitter for indicating the weight of the load or charge as a function of the signal.

According to a further feature of the invention, the direction of the load or charge is also indicated.

DETAILED DESCRIPTION

Figure 1:
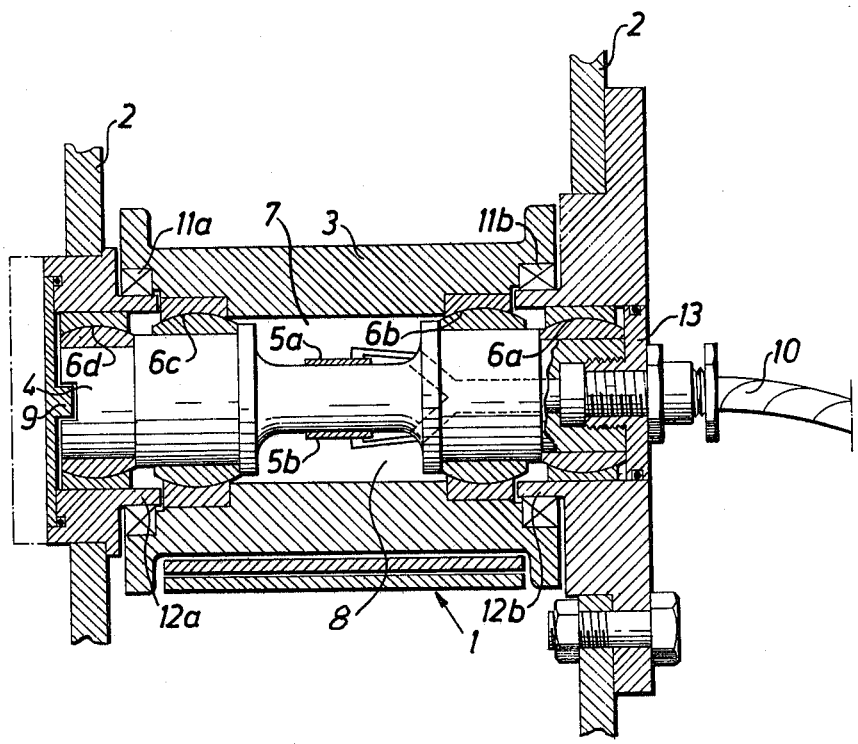
FIG. 1 is a vertical section through an attachment with a roller placed therein.

The reference numeral 1 indicates the end portion of, for example, the leaf spring package of a truck. In the brackets of a conventional spring attachment 2 provided on the vehicle, an axle 4 is fixed against rotation by a locking member 9, and in relation to said axle 4 a rigid roller 3 is rotatably mounted via two joint or self-aligning bearings 6b, 6c. The axle 4 further is provided with two additional joint or self-aligning bearings 6a, 6d, and the embodiment shown also includes centrally two recesses 7, 8, which are located one above the other in the vertical direction. In each of the recesses 7 and 8, respectively, two transmitters 5a and 5b, respectively, are provided as transmitter units which, for example, are wire strain gauges glued on the axle 4 in the recesses 7, 8.

The joint or self-aligning bearings 6 have the object to permit a certain movement in the longitudinal direction of the axle 4 without giving rise to concentrated load (i.e., to permit the axle 4 to float within a certain range).

Figure 2:
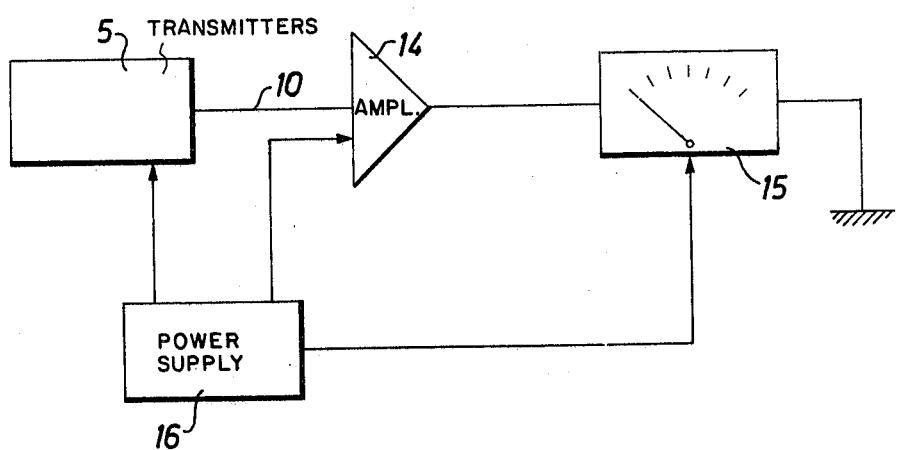
FIG. 2 is a block diagram for the electric part of the roller shown in FIG. 1.

The peripheral surface of the roller 3 is abutted by the end portion of the spring package 1 of the vehicle, and the forces acting in the vertical direction on the roller 3 are transferred by said roller 3 via the bearings 6 to the axle 4 and therewith to the transmitters 5, from which load-responsive electrical signals are fed via a cable 10 running centrally in a hole in the axle 4 to an indication or processing unit 15 preferably disposed in the driver's cabin of the vehicle via an amplifier 14 (FIG. 2) to indicate and/or present the gauged forces in a suitable way. The current feed for the circuit is obtained from a power supply 16.

Contrary to the above-discussed prior art devices, the forces or loads acting in a direction other than the vertical direction do not affect the deflection of the transmitters 5 owing to the rotation of the roller 3.

The roller 3 is sealed via two circular sealing rings 11a, 11b against shoulders 12a, 12b in order to prevent dirt from penetrating into the joint bearings 6. The sealing rings 11a, 11b may be of the oil seal type, i.e. rubber rings with lip sealing. Furthermore, the locking member 9 sealed by a sealing ring, and a cover plate 13 sealed by a sealing ring serve as closure means at the ends of the axle 4. Centrally through the cover plate 13 and axle 4 runs the aforesaid cable 10.

In the embodiment shown in the drawing the force or load to be gauged acts from below on the peripheral surface of the roller 3. The force, of course, can act straight from above, and it also is possible to position the entire roller in the vertical direction and thereby be able to gauge horizontal forces.

Instead of gauging the load in a spring attachment of a truck, the invention, of course, can be applied in other connections where, by means of a load-sensing axle, a force is to be measured which acts in a certain direction, but without forces having other directions affecting the measuring result. Examples of such application fields are vehicle wheels, rope pulleys, joints, stationary or mobile scales, etc.

I claim as my invention:

1. Apparatus for indicating a charge or load on an axle (4), first means (6a, 6d) for supporting said axle (4) at two positions which are spaced apart in the longitudinal direction of said axle (4), said first means including self-aligning means for floatingly journalling said axle at said two positions relative to a support (2); a substantially inelastic roller (3) on said axle (4), on the peripheral surface of which roller said charge or load is arranged to act;

second means (6b, 6c) for rotatably supporting said roller (3) on said axle (4) and for permitting said roller (3) to float relative to said axle (4) at two spaced positions respectively disposed adjacent said spaced supporting positions of said axle (4) and substantially equally spaced relative to the centre of said axle (4);

at least one transmitter (5) mounted on said axle (4) and located in the area between said spaced roller supporting positions for generating a signal in response to, and as a function of, deflection of said axle (4) under the influence of said charge or load acting on said roller (3) ; and third means (14, 15, 16) coupled to said at least one transmitter (5) for indicating the weight of said load or charge as a function of said signal.

2. Apparatus according to claim 1, comprising two transmitters (5a, 5b), one coupled to the upper part of said axle, and the other coupled to a lower part of said axle.

3. Apparatus according to claim 1, wherein a recess is provided in a central portion of said axle, said at least one transmitter (5) being located in said recess.

4. Apparatus according to claim 1, wherein a recess is provided both at the top and bottom of said axle, and at least two transmitters (5) are provided, one of said transmitters being coupled to said axle in said top recess, and the other of said transmitters being coupled to said axle in said bottom recess.

5. Apparatus according to claim 1, wherein said at least one transmitter (5) is a wire strain gauge adhered to said axle (4).

6. Apparatus according to claim 1, wherein said first and second means comprise self-aligning joint bearings.

7. Apparatus according to claim 1, wherein said axle is fixed.

8. Apparatus according to claim 7, wherein said axle is fixed at both ends thereof.

9. Apparatus according to claim 1, wherein said axle (4) is provided with two recesses (7, 8), said recesses being located one above the other in the vertical direction, and comprising a transmitter (5) located in each of said recesses.

10. Apparatus according to claim 9, wherein said transmitters are wire strain gauges adhered on said axle (4) in said respective recesses.

* * * * *